3,510,443
FILLED EPIHALOHYDRIN POLYMER
Edwin J. Vandenberg and William D. Willis, Wilmington, Del., assignors to Hercules Incorporated, a corporation of Delaware
No Drawing. Filed Apr. 26, 1966, Ser. No. 545,263
Int. Cl. C08g 51/04; C08k 1/08
U.S. Cl. 260—37
9 Claims

ABSTRACT OF THE DISCLOSURE

A cross-linked, siliceous-filled epihalohydrin homopolymer or copolymer with at least one other exopide is improved by the addition of an epoxy- or halo-substituted silane either before or during compounding. These products have increased modulus and tear strength as well as better flex life and improved elastic recovery.

---

This invention relates to cross-linked epihalohydrin polymers. More particularly, this invention relates to epihalohydrin polymers containing siliceous reinforcing fillers and a reactive silane.

It is known that high molecular weight polymers and copolymers of epihalohydrin can be cross-linked with urea, thiourea, ammonia, various polyamines or certain heterocyclic compounds in combination with a metal compound to produce rubbers that have numerous good attributes. It is also known that the presence of a reinforcing filler is beneficial.

Now in accordance with this invention, it has unexpectedly been found that certain physical properties of cross-linked siliceous-filled epihalohydrin polymers are improved when a small amount of reactive silane is added to the siliceous filler either before or during compounding. In particular, a small amount of a reactive silane, having the formula $R_2SiZ$ where in at least one R is an epoxy- or halo-substituted organic radical attached to silicon through a Si-C linkage and the other R's are the same or alkoxy, aryloxy, cycloalkoxy, arylalkoxy, alkanoyloxy, alkyl, arylalkyl, alkaryl or halogen and Z is alkoxy, aryloxy, cycloalkoloxy, arylalkoxy, alkanoyloxy or halogen, has been found to yield products having higher modulus and tear strength, better flex life, increased heat-aging resistance and improved elastic recovery. These improved properties are advantageous for many uses of epihalohydrin polymers and particularly desirable in elastic fiber applications.

Any high molecular weight polymer of an epihalohydrin is suitable for the purpose of this invention. Such polymers can be homopolymers prepared by polymerizing a monomeric epihalohydrin, e.g., epifluorohydrin, epichlorohydrin, epibromohydrin, or epiiodohydrin. They can also be copolymers in which the repeating units are derived from mixtures in any proportion of two or more molecular species of monomeric epihalohydrin, such as for example, mixtures of epichlorohydrin and epibromohydrin or mixtures of epibromohydrin, epifluorohydrin and epiiodohydrin. They can also be copolymers of epihalohydrins with one or more epoxides in which at least about 20% preferably at least about 50% by weight is derived from epihalohydrins, such as for example a copolymer of propylene oxide and epichlorohydrin, a terpolymer of propylene oxide, ethylene oxide and epichlorohydrin or a terpolymer of allylglycidyl ether, propylene oxide and epichlorohydrin. The polymer can be essentially wholly amorphous, a mixture of amorphous and crystalline polymers or essentially wholly crystalline. Generally, the amorphous poymers provide the most rubbery products. However, excellent rubbery products are obtained from mixtures of amorphous and crystalline polymers. In this case the amount of the crystallinity will preferably be less than about 30% by weight of the polymer or mixture of polymers.

The epihalohydrin polymers of this invention are essentially linear polyethers in which polymerization, at least in major part, has taken place through the epoxide linkage so that the polymer contains halomethyl groups attached to the main polymer chain. The homopolymers are believed to have the following general formula:

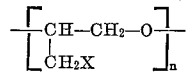

in which X is halogen and $n$ is a numeral designating the number of repeating units in the polymer. In the same way, when an epihalohydrin is copolymerized with one or more other epoxides (including other epihalohydrins), polymerization takes place through the epoxide linkage even though other polymerizable groups may be present, and it is apparent that such copolymers also contain halomethyl groups attached to the main polymer chain.

Typical of other exopides that can be copolymerized with epihalohydrins to produce the polymers used in this invention include, by way of example, the alkylene oxides such as ethylene oxide, propylene oxide, butene-1 oxide, cis- and trans-butene-2 oxides, hexene-1 oxide, hexene-2 oxide, dodecene-1 oxide, isobutylene epoxide, and the like; cycloaliphatic epoxides such as cyclohexene oxides, vinyl cyclohexene oxides (both mono- and dioxides), α-pinene exopide, dipentenet epoxide, and the like; epoxy ethers such as ethyl glycidyl ether, isopropyl glycidyl ether, tert-butyl glycidyl ether, phenyl glycidyl ether, chlorophenyl glycidyl ether, 2-chloroethyl gycidyl ether, ethylphenyl glycidyl ether, vinyl glycidyl ether, allyl glycidyl ether, methallyl glycidyl ether, o-allylphenyl glycidyl ether, vinyl cyclohexyl glycidyl ether, p-vinylbenzyl glycidyl ether, and the like; ethylenically unsaturated glycidyl esters such as glycidyl crotonate, glycidyl oleate, glycidyl methacrylate, and the like; and other epoxides such as, for example, styrene oxide, α-methylstyrene oxide, butadiene monoxide, butadiene dioxide, epoxy stearates, 3,4-epoxy-1-pentene, 3,4 - epoxy - 1 - vinylcyclohexene, divinylbenzyl monoxide, and the like.

The epihalohydrin polymers used in this invention are characterized by having a weight average molecular weight of at least about 40,000 and preferably at least about 100,000. Molecular weights of this order usually correspond to reduced specific viscosity, $\eta_{sp./c.}$, of at least about 0.2 and preferably at least about 0.5. Reduced specific viscosities are generally determined on solutions of the polymers at 0.1% concentration in α-chloronaphthalene at 100° C., although polymers high in epifluorohydrin content are preferably determined on solutions thereof at 0.1% concentration in cyclohexanone at 50° C.

The polymers employed in this invention can be prepared by contacting an ephalohydrin monomer, mixture of epihalohydrin monomers, or mixture of epihalohydrin monomer and at least one other epoxide with an organoaluminum compound, preferably one which has been reacted with about 0.01 to about 1.5 moles of a chelating agent such as acetylacetone, benzoylacetone, acetoacetic acid, ethyl glycolate, oxalic acid, glyoxal monoxime, etc. and/or reacted with from about 0.1 to about 1.5 moles of water per mole of the organoaluminum compound. Exemplary of the organoaluminum compounds that can be so reacted with the chalating agent and/or water and used as a catalyst are triethylaluminum, triisobutylaluminum, diethylaluminum hydride, etc.

The polymerization reaction is generally carried out in the presence of an inert, liquid, organic diluent but can be carried out in an essentially bulk polymerization process. Suitable diluents which can be used for the polymerization are the ethers, halogenated hydrocarbons, hydrocarbons, and mixtures of such diluents. The temperature of the polymerization process can be carried over a wide range, generally from about −80° C. to about 250° C., and while atmospheric pressure is usually used, the pressure can be carried from subatmospheric up to several atmospheres.

These epihalohydrin polymers generally contain a small amount (i.e., from about 0.1% to about 2% by weight) of antioxidant added at the time of their preparation. It may in some cases be desirable to add a small additional amount of antioxidant at the time of cross-linking the polymer. Exemplary of the most preferred antioxidants are phenyl-β-napthylamine, di-β-naphthyl-p-phenylenediamine, sym - di - β - naphthyl-p-phenylene diamine, N-isooctyl-p-aminophenol, the reaction product of diphenylamine and acetone, polymerized trimethyldihydroquinoline, nickel dibutyldithiocarbamate, 4,4'-thiobis(6-tert-butyl-m-cresol), the reaction product of crotonaldehyde and 3-methyl-6-tert-butyl phenol, etc.

As pointed out above, various polyamines can be used as cross-linking agents for epihalohydrin polymers. Exemplary of such polyamines are aliphatic amines such as ethylenediamine, propylenediamine, tetramethylenediamine, hexamethylenediamine, diethylentriamine, etc.; cycloaliphatic amines such as melamine, piperazine, pyrazine, etc.; aromatic amines such as p-phenylene diamine, naphthalenediamine, biphenyldiamine, etc., and polymeric amines such as poly(2-methyl-5-vinyl pyridine), etc. Instead of the free amine, a salt of the amine can be used. Internal salts of the amines can also be used as, for example, hexamethylenediamine carbamate, which type of salt decomposes to the fre amine at or below the curing temperature. In addition to the polyamines, the epihalohydrin polymers can be cross-linked with a heterocyclic compound selected from the group consisting of 2-mercaptomidazolines and 2-mercaptropyrimidines in combination with at least one metal compound selected from the group consisting of salts or aromatic carboxylic acids, salts of aliphatic carboxylic acids, salts of carbonic acid, salts of phosphorous acid, salts of silicic acid and oxides of the metals of Groups II–A, II–B and IV–A of the Periodic Table (Lange's Handbok of Chemistry, 8th edition, pages 56–57, 1952). In addition to the above cross-linking agents, urea, thiourea, ammonia and ammonium salts can also be used.

When cross-linking with a polyamine, urea, thiourea or ammonia, the amount employed will depend primarily upon the degre of cross-linking desired. Generaly, from about 0.25% to about 10% and preferably from about 0.5% to about 5% based on the weight of the polymer will be employed. When using a heterocyclic compound in combination with a metal compound to effect cross-linking, the optimum amount of each compound will again depend upon the degree of cross-linking desired. Generally, however, the amounts added (based on the weight of the polymer) will be within the following ranges: metal compound from about 2% to about 20%; heterocyclic compound from about 0.2% to about 10%.

Any siliceous type filler can be used in accordance with this invention. Exemplary siliceous fillers are finely divided silicas such as fumed silica, precipitated silica, arc silica, silica aerogel, etc. In addition to the above, finely divided clays, asbestos and mica can also be used. Various amounts of the siliceous filler can be employed depending upon the specific results desired. In general, however, from about 10% to about 80%, preferably from about 20% to about 60%, of siliceous filler based on the weight of the polymer will be employed. The preferred amount will depend on the particular siliceous filler, particularly its particle size.

The reactive silanes employed in this invention are generally clear liquids containing functional epoxy or halo groups. As stated above, the silane will have the formula $R_3SiX$ wherein at least one R is an epoxy- or halo-substituted organic radical attached to silicon through a Si-C linkage and the other R's are the same or alkoxy, aryloxy, cycloalkoxy, arylalkoxy, alkanoyloxy, alkyl, arylalkyl, alkaryl or halogen and X is alkoxy, aryloxy, cycloalkoxy, arylalkoxy, alkanoyloxy or halogen. Exemplary reactive silanes are the silanes containing epoxy substituted groups such as glycidoxmethyl trimethoxysilane, glycidoxypropyl trimethoxysilane, glycidoxyethyl triiodosilane, glycidoxy-n-butyl dimethoxy methyl silane, glycidoxyethyl trichlorosilane, cis-2,3-epoxybutoxypropyl triethoxysilane, glycidyl trimethoxysilane, glycidyl tribromosilane, 1,2-epoxypropyl trichlorosilane, 2,3-epoxypropyl chlordimethoxysilane, 3,4-epoxycyclohexyl-1-methyl triacetoxysilane, 3,4-epoxycyclohexyl-1-ethyl trimethoxysilane, 3,4-epoxycyclohexyl-1-ethoxy propyl tribromosilane, etc.; and the silanes containing halo substituted groups such as chloroethyl trimethoxysilane, chloropropyl trimethoxysilane, diiodopropyl triethoxysilane, chloromethoxy ethyl trimethoxysilane, bromoethoxypropyl dimethyl phenoxysilane, difluoroethoxy isobutyl dipropoxychlorosilane, 3,4-dichlorocyclohexyl-1-ethyl trimethoxysilane, 3-bromocyclohexyl-1-propoxymethyl tripropionyloxysilane, etc. Chemical bonding of the silica to the polymer results from reaction of the functional epoxy or halo groups with the cross-linking agent, which in turn reacts with the chlorine groups on the polymer. As stated above the reactive silane will be added either during compounding or before compounding. When adding before compounding, the silane will be reacted with the filler in an appropriate manner, reaction in the vapor phase being especially desirable. During compounding, the silane can be added in the liquid form either before or after the filler. In any event the silane should preferably be added to the polymer and mixed in before the addition of the cross-linking agent. The amount of silane used is fairly critical, best results being obtained when an amount of from about 0.1 part per hundred to about 3.0 parts per hundred based on the polymer are used. The optimum amount will depend on the silane, filler and method of addition. For example, the smaller amounts can advantageously be used when the silane is added to the filler before compounding.

The cross-linking agents, fillers and silane can be compounded or admixed with the polymer in any desired fashion. For example, they can be uniformly blended with the polymer by simply milling on a conventional rubber mill or a Banbury mixer. By this means, the ingredients are uniformly distributed throughout the polymer and uniform cross-linking is effected when the blend is subjected to heat. It is generally preferable to mill at temperatures within the range of from about 70° F. to about 200° F. However, the blends are highly scorch resistant below about 250° F. Other methods of compounding the ingredients with the polymer will be apparent to those skilled in the art.

The conditions under which the cross-linking is effected can be varied over a wide range. Cross-linking can be effected in minutes at temperatures around 300° F. or in days at room temperature. In general, the cross-linking temperautre will be within the range of from about 250° F. to about 350° F. and preferably from about 280° F. to about 340° F. The time will vary inversely with the temperature and will range from about 10 to about 120 minutes and preferably from about 20 minutes to about 60 minutes. Cross-linking will generally be conducted under a compression of at least about 500 p.s.i. in a suitable press, although it can be conducted in the open without pressure.

In addition to the cross-linking agents, fillers, and silane, other ingredients can also be incorporated. The additives commonly used in rubber vulcanization can be used here also, as, for example, extenders, pigments, plasticizers, softeners, processing lubricants, stabilizers, etc. The presence of a stabilizer and, in particular an acid acceptor, such as a lead compound (e.g., red lead oxide, etc.), calcium stearate or magnesium oxide is beneficial.

Obviously, there are cases in which other ingredients are not required and excellent results are achieved when only the cross-linking agents, fillers and silane are added.

The following examples will illustrate the invention, all parts and percentages being by weight.

General procedure for compounding of compositions

In all of the examples, polymer stocks were made up by mixing on a two-roll mill. The temperatures of the rolls were maintained at approximately 160° F. (front roll) and 190° F. (back roll) during the entire compounding procedure. The polymer was first added to the mill and when it banded (within about 2 minutes) a processing lubricant was added, followed by the complete addition of the siliceous filler. In those cases where the silane was added during compounding, it was added following the siliceous filler. After the addition of the filler and silane the composition was allowed to stand a minimum of 16 hours prior to the incorporation of antioxidant, acid acceptor stabilizer and cross-linking agent. On completion of the addition of compounding ingredients, the milling sheet was crosscut 12 times and end-rolled 6 times to insure good dispersion of the compounding ingredients. All stocks were cured in two-part preheated steel molds maintained at 340° F. under a mold pressure of approximately 550 p.s.i. Specimen thickness was approximately 32 mils. The cured sheets were allowed to cool to room temperature over a minimum of 2 hours prior to cutting specimens for testing.

Examples 1–4

In these examples, epichlorohydrin-ethylene oxide copolymer was milled and cross-linked with 2-mercaptoimidazoline. All of the polymers in the examples were filled with fumed silica. The polymer in Example 1 contained no silane. The polymers in Examples 2 and 3 contained a reactive silane added during compounding and the polymer in Example 4 contained a nonreactive silane also added during compounding. The cure time was 45 minutes in each example. The amounts of the ingredients (by parts) in each formulation along with various physical properties of the cross-linked products as well as some data on cut threads from the cross-linked sheet are given in Table I.

TABLE I

|  | 1 | 2 | 3 | 4 |
|---|---|---|---|---|
| Epichlorohydrin, ethylene oxide copolymer (68 wt. percent epichlorohydrin, RSV 5.0) | 100 | 100 | 100 | 100 |
| Zinc stearate | 0.75 | 0.75 | 0.75 | 0.75 |
| Fumed silica (surface area, 195 sq. m./g.) | 30 | 30 | 30 | 30 |
| γ-Glycidoxypropyltrimethoxysilane |  | 1.0 | 2.0 |  |
| Amyltriethoxysilane |  |  |  | 1.0 |
| Red lead | 3.0 | 3.0 | 3.0 | 3.0 |
| Zinc oxide | 2.0 | 2.0 | 2.0 | 2.0 |
| Nickel dibutyl dithiocarbamate | 1.0 | 1.0 | 1.0 | 1.0 |
| 2-mercaptoimidazoline | 1.5 | 1.5 | 1.5 | 1.5 |

|  | Unaged | Aged [a] | Unaged | Aged [a] | Unaged | Aged [a] | Unaged | Aged [a] |
|---|---|---|---|---|---|---|---|---|
| 300% modulus, p.s.i. | 835 | 1,885 | 1,400 | 1,590 | 1,115 | 1,100 | 810 | 2,115 |
| Tensile strength, p.s.i. | 3,230 | 3–080 | 4,040 | 3,440 | 4,140 | 3,275 | 4,600 | 3,25 |
| Maximum elongation, percent | 650 | 460 | 620 | 550 | 780 | 690 | 800 | 425 |
| Shore A hardness | 69 | 71 | 66 | 70 | 63 | 65 | 74 | 74 |
| Break set, percent | 13 | 5 | 10 | 10 | 10 | 13 | 20 | 10 |
| Graves tear, lbs./inch | 177 |  | 280 |  | 280 |  | 190 |  |
| Flex life (No. of flexes to break 10 threads) [b] | 3,500 |  | 3,800 |  | 9,000 |  | 1,900 |  |
| Modulus at 300% elongation, p.s.i.: |  |  |  |  |  |  |  |  |
| 1st cycle out/return | 626/327 |  | 1,311/445 |  | 1,130/377 |  | 638/344 |  |
| 3rd cycle out/return | 355/297 |  | 486/410 |  | 410/344 |  | 382/308 |  |

[a] 1 day/300° F. in air-circulating oven.
[b] Ten cut threads of 6,600 denier are flexed to 300% elongation and back to 50% elongation at a rate of 100 cycles per minute.

Examples 5 and 6

In these examples, epichlorohydrin-ethylene oxide copolymer was blended with amorphous and partially crystalline epichlorohydrin homopolymers: In each example the polymer blend was filled with fumed silica and a reactive silane was added during compounding. The cure time was 45 minutes in each example. The amounts of the ingredients (by parts) in each formulation along with various physical properties of the cross-linked products and cut threads from the cross-linked products are given in Table II.

TABLE II

|  | 5 | 6 |
|---|---|---|
| Epichlorohydrin, ethylene oxide copolymer (68 wt. percent epichlorohydrin, RSV 5.0) | 50 | 50 |
| Polyepichlorohydrin (16% crystallinity, RSV 1.6) | 50 |  |
| Polyepichlorohydrin (amorphous, RSV 1.4) |  | 50 |
| Zinc stearate | 0.75 | 0.75 |
| Fumed Silica (surface area, 195 sq. m./g | 30 | 30 |
| γ-Glycidoxypropyltrimethoxysilane | 1.0 | 1.0 |
| Zinc oxide | 2.0 | 2.0 |
| Red lead | 3.0 | 3.0 |
| Nickel dibutyl dithiocarbamate | 1.0 | 1.0 |
| 2-mercaptoimidazoline | 1.5 | 1.5 |

|  | Unaged | Aged [a] | Unaged | Aged [a] |
|---|---|---|---|---|
| 300% modulus, p.s.i. | 1,300 | 1,725 | 1,420 | 2,010 |
| Tensile strength, p.s.i. | 4,520 | 3,250 | 4,225 | 3,370 |
| Maximum elongation, percent | 775 | 525 | 725 | 450 |
| Shore A hardness | 67 | 75 | 74 | 78 |
| Break set, percent | 10 | 20 | 25 | 20 |
| Graves tear, lbs./inch | 275 |  | 290 |  |
| Flex life (No. of flexes to break 10 threads) [b] | 10,000 |  | 12,000 |  |

[a] 1 day/300° F. in air-circulating oven.
[b] See Table I.

Examples 7–11

In these examples, epichlorohydrin-ethylene oxide copolymer was milled and cross-linked with 2-mercaptoimidazoline. All of the polymers in the examples were filled with fumed silica. The polymer in Example 7 contained no silane. In Examples 8–11 a reactive silane was added to the silica filler in the vapor phase prior to compounding. The cure time was 45 minutes in each example. The amounts of the ingredients (by parts) in each formulation along with various physical properties of the cross-linked products are given in Table III.

Examples 12–13

In these examples, epichlorohydrin-ethylene oxide copolymer was milled and cross-linked with 2-mercaptoimidazoline. Both polymers in the examples were filled with fumed silica. The polymer in Example 12 contains no silane while the polymer in Example 13 contains a reactive silane added in the vapor phase to the silica filler prior to compounding. The cure time was 45 minutes in each example. The amounts of the ingredients (by parts) in each formulation along with various physical properties of the cross-linked products are given in Table IV.

TABLE IV

|  | 12 | | 13 | |
| --- | --- | --- | --- | --- |
| Epichlorohydrin, ethylene oxide copolymer (68 wt. percent epichlorohydrin, RSV 5.0) | 100 | | 100 | |
| Zinc stearate | 0.75 | | 0.75 | |
| Fumed silica a | 30 | | | |
| Fumed silica a (containing 4% chloropropyltrimethoxysilane) | | | 30 | |
| Zinc oxide | 2.0 | | 2.0 | |
| Red lead | 3.0 | | 3.0 | |
| Nickel dibutyl dithiocarbamate | 1.0 | | 1.0 | |
| 2-mercaptoimidazoline | 1.5 | | 1.5 | |
|  | Unaged | Aged b | Unaged | Aged b |
| 300% modulus, p.s.i. | 740 | 1,540 | 1,150 | 1,630 |
| 500% modulus, p.s.i. | 1,150 | 2,860 | 2,310 | 3,030 |
| Tensile strength, p.s.i. | 4,365 | 3,570 | 4,335 | 3,360 |
| Maximum elongation, percent | 935 | 625 | 760 | 550 |
| Shore A hardness | 65 | 66 | 69 | 70 |
| Break set, percent | 30 | 10 | 10 | 10 |
| Graves tear, lbs./inch | 232 | | 310 | | a Surface area, 200 sq. m./g.
b 1 day/300° F. in air-circulating oven.

Examples 14–16

In these examples, epichlorohydrin-ethylene oxide copolymer was milled and cross-linked with 2-mercaptoimidazoline. All of the polymers in the examples were filled with fumed silica. The polymer in Example 14 contained no silane. The polymers in Examples 15 and 16 contain a reactive silane added during compounding. The cure time was 45 minutes in each example. The amounts of the ingredients (by parts) in each formulation along with various physical properties of the cross-linked products and cut threads from the cross-linked products are given in Table V.

TABLE III

|  | 7 | | 8 | | 9 | | 10 | | 11 | |
| --- | --- | --- | --- | --- | --- | --- | --- | --- | --- | --- |
| Epichlorohydrin, ethylene oxide copolymer (68 wt. percent epichlorohydrin, RSV 5.0) | 100 | | 100 | | 100 | | 100 | | 100 | |
| Zinc stearate | 0.75 | | 0.75 | | 0.75 | | 0.75 | | 0.75 | |
| Fumed silica a | 30 | | | | | | | | | |
| Fumed silica a (containing 3% γ-glycidoxypropyltrimethoxysilane) | | | 30 | | | | | | | |
| Fumed silica a (containing 3% chloropropyltrimethoxysilane) | | | | | 30 | | | | | |
| Fumed silica a (containing 1.5% chloropropyltrimethoxysilane) | | | | | | | 30 | | | |
| Fumed silica a (containing 0.5% chloropropyltrimethoxysilane) | | | | | | | | | 30 | |
| Zinc oxide | 2.0 | | 2.0 | | 2.0 | | 2.0 | | 2.0 | |
| Red lead | 3.0 | | 3.0 | | 3.0 | | 3.0 | | 3.0 | |
| Nickel dibutyl dithiocarbamate | 1.0 | | 1.0 | | 1.0 | | 1.0 | | 1.0 | |
| 2-mercaptoimidazoline | 1.5 | | 1.5 | | 1.5 | | 1.5 | | 1.5 | |
|  | Unaged | Aged b | Unaged | Aged b | Unaged | Aged b | Unaged | Aged b | Unaged | Aged b |
| 300% modulus, p.s.i. | 670 | 1,315 | 900 | 1,390 | 930 | 1,350 | 1,070 | 1,405 | 800 | 1,370 |
| 500% modulus, p.s.i. | 1,210 | 2,770 | 1,920 | 2,960 | 2,280 | 2,730 | 2,320 | 2,960 | 1,720 | 2,860 |
| Tensile strength, p.s.i. | 5,110 | 3,560 | 4,940 | 3,630 | 4,220 | 2,730 | 4,850 | 3,740 | 4,660 | 3,140 |
| Maximum elongation, percent | 935 | 590 | 850 | 580 | 725 | 500 | 810 | 605 | 855 | 535 |
| Shore A hardness | 70 | 71 | 68 | 72 | 69 | 68 | 68 | 69 | 68 | 69 |
| Break set, percent | 10 | 10 | 5 | 10 | 5 | 5 | 0 | 15 | 10 | 15 |
| Graves tear, lbs./inch | 225 | | 281 | | 318 | | 280 | | 244 | | a Surface area, 200 sq. m./g.
b 1 day/300° F. in air-circulating oven.

TABLE V

| | 14 | | 15 | | 16 | |
|---|---|---|---|---|---|---|
| Epichlorohydrin, ethylene oxide copolymer (68 wt. percent epichlorohydrin, RSV 5.0) | 100 | | 100 | | 100 | |
| Zinc stearate | 0.75 | | 0.75 | | 0.75 | |
| Fumed silica (surface area, 325 sq. m./g.) | 30 | | 30 | | 30 | |
| Chloropropyltrimethoxysililane | | | 1.0 | | 2.0 | |
| Nickel dibutyl dithiocarbamate | 1.0 | | 1.0 | | 1.0 | |
| Zinc oxide | 2.0 | | 2.0 | | 2.0 | |
| Red lead | 3.0 | | 3.0 | | 3.0 | |
| 2-mercaptoimidazoline | 1.5 | | 1.5 | | 1.5 | |
| | Unaged | Aged [a] | Unaged | Aged [a] | Unaged | Aged [a] |
| 300% modulus, p.s.i | 650 | 1,220 | 1,100 | 1,110 | 780 | 1,080 |
| 500% modulus, p.s.i | 1,115 | 2,790 | 2,210 | 2,250 | 1,820 | 2,140 |
| Tensile strength, p.s.i | 5,090 | 3,460 | 5,350 | 3,450 | 5,640 | 3,390 |
| Maximum elongation, percent | 940 | 550 | 860 | 640 | 940 | 620 |
| Shore A hardness | 74 | 74 | 70 | 74 | 73 | 75 |
| Break set, percent | 10 | | 15 | | 15 | |
| Graves tear, lbs./inch | 240 | | 270 | | 295 | |
| Flex life (flexes to break 10 threads) [b] | 15,000 | | 19,000 | | 20,000 | |
| Percent change in 300% modulus after boiling in water for 2 hours, 1st cycle out/return [c] | −34.2/−17 | | −7.3/+7.6 | | +9.1/+9.8 | |
| Percent change in 300% modulus after 10 day aging in 300 p.s.i. $O_2$ at 150° F. [c] | −54.7/−33.6 | | +12.0/+2.2 | | +0.4/−0.9 | |

[a] 1 day/300° F. in air-circulation oven.
[b] See Table I.
[c] The polymers were treated while stretched to 100% elongation.

Examples 17 and 18

In these examples, polyepichlorohydrin was milled and cross-linked with 2-mercaptopyrimidine. The polymers in both examples were filled with magnesium silicate. The polymer in Example 18 contained no silane while the polymer in Example 17 contained a reactive silane added during compounding. The cure time was 45 minutes in each example. The amounts of the ingredients (by parts) in each formulation along with various physical properties of the cross-linked products are given in Table VI.

TABLE VI

| | 17 | 18 |
|---|---|---|
| Polyepichlorohydrin (RSV 1.4) | 100 | 100 |
| Zinc stearate | 1.0 | 1.0 |
| Magnesium silicate (surface area, 20 sq. m./g.) | 50 | 50 |
| 3,4-epoxycyclohexyl-1-ethyltrimethoxysilane | 1.0 | |
| Calcium stearate | 2.0 | 2.0 |
| Zinc oxide | 2.0 | 2.0 |
| 2-mercaptopyrimidine | 2.0 | 2.0 |
| | Ungaged | Ungaged |
| 300% modulus, p.s.i | 450 | 275 |
| Tensile strength, p.s.i | 2,000 | 2,100 |
| Maximum elongation, percent | 950 | 900 |
| Shore A hardness | 60 | 58 |
| Graves tear, lbs./inch | 150 | 100 |

Examples 19 and 20

In these examples, polyepichlorohydrin was milled and cross-linked with hexamethylenediamine carbamate. The polymers in both examples were filled with magnesium silicate. The polymer in Example 20 contained no silane while the polymer in Example 19 contained a reactive silane added during compounding. The cure time was 45 minutes in each example. The amounts of the ingredients (by parts) in each formulation along with various physical properties of the cross-linked products are given in Table VII.

TABLE VII

| | 19 | 20 |
|---|---|---|
| Polyepichlorohydrin (RSV 1.4) | 100 | 100 |
| Zinc stearate | 1.0 | 1.0 |
| Magnesium silicate (surface area, 20 sq. m./g.) | 50 | 50 |
| γ-Glycidoxybutyl trichlorosilane | 1.0 | |
| Calcium stearate | 2.0 | 2.0 |
| Zinc oxide | 2.0 | 2.0 |
| Hexamethylenediamine carbamate | 1.5 | 1.5 |
| | Unaged | Unaged |
| 300% modulus, p.s.i | 500 | 310 |
| Tensile strength, p.s.i | 2,250 | 2,200 |
| Maximum elongation, percent | 850 | 820 |
| Shore A hardness | 62 | 60 |
| Graves tear, lbs/inch | 140 | 98 |

What we claim and desire to protect by Letters Patent is:

1. In the process of cross-linking a polymer of epihalohydrin which comprises heating said polymer in admixture with from 0.25% to about 10% by weight of the polymer of a cross-linking agent selected from the group consisting of urea, thiourea, ammonia, ammonium salts, polyamines, hydrogen halide salts of polyamines, polyamine carbamates and a combination of at least one metal compound selected from salts of aromatic carboxylic acids, salts of aliphatic carboxylic acids, salts of carbonic acid, salts of phosphorous acid, salts of silicic acid and oxides of the metals of Groups II–A, II–B and IV–A of the Periodic Table and an agent selected from the group consisting of 2-mercaptoimidazolines and 2-mercaptopyrimidines the improvement of compounding said polymer with from about 10 parts per hundred by weight to about 80 parts per hundred by weight of a siliceous-type filler and from about 0.1 part per hundred by weight to about 3.0 parts per hundred by weight of a reactive silane having the formula $R_3SiZ$ wherein at least one R is an epoxy or halo substituted organic radical selected from the group consisting of hydrocarbon, ether and ester radicals attached to silicon through a Si–C linkage and the other R's are alkoxy, aryloxy, cycloalkoxy, arylalkoxy, alkanoyloxy, alkyl, arylalkyl, alkaryl or halo radicals and Z is an alkoxy, aryloxy, cycloalkoxy, arylalkoxy, alkanoyloxy or halo radical, said epihalohydrin polymer being selected from the group consisting of homopolymers of epihalohydrins and copolymers of an epihalohydrin with at least one other epoxide and having a molecular weight of at least 40,000.

2. The process of claim 1 wherein the reactive silane has been added to the siliceous-type filler before compounding with the polymer.

3. The process of claim 1 wherein the reactive silane is added to the siliceous-type filler and polymer during compounding.

4. The process of claim 1 wherein the siliceous-type filler is fumed silica.

5. The process of claim 1 wherein the reactive silane is γ-glycidoxypropyltrimethoxysilane.

6. The process of claim 1 wherein the reactive silane is chloropropyltrimethoxysilane.

7. The process of claim 1 wherein the reactive silane is 3,4-epoxycyclohexyl-1-ethyl trimethoxysilane.

8. A cross-linked polymer of epihalohydrin prepared by compounding said polymer with from about 10 parts per hundred by weight to about 80 parts per hundred by weight of a siliceous-type filler and from about 0.1 part per hundred by weight to about 3.0 parts per hundred by weight of a reactive silane having the formula $R_3SiZ$ wherein at least one R is an epoxy or halo-substituted organic radical selected from the group consisting of hydrocarbon, ether and ester radicals attached to silicon through a Si-C linkage and the other R's are alkoxy, aryloxy, cycloalkoxy, arylalkoxy, alkanolyloxy, alkyl, arylalkyl, alkaryl or halo radicals and Z is an alkoxy, aryloxy, cycloalkoxy, arylalkoxy, alkanoyloxy or halo radical, and heating said polymer in admixture with from about 0.25% to about 10% by weight of the polymer of a cross-linking agent selected from the group consisting of urea, thiourea, ammonia, ammonium salts, polyamines, hydrogen halide salts of polyamines, polyamine carbamates and a combiantion of at least one metal compound selected from salts of aromatic carboxylic acids, salts of aliphatic carboxylic acids, salts of carbonic acid, salts of phosphorous acid, salts of silicic acid and oxides of the metals of Groups II-A, II-B and IV-A of the Periodic Table and an agent selected from the group consisting of 2-mercaptoimidazolines and 2-mercaptopyrimidines, said epihalohydrin polymer being selected from the group consisting of homopolymers of epihalohydrins and copolymers of an epihalohydrin with at least one other epoxide and having a molecular weight of at least 40,000.

9. The product of claim 8 wherein the cross-linked polymer of epihalohydrin is an elastomeric copolymer of ethylene oxide and epichlorohydrin.

References Cited

UNITED STATES PATENTS

| | | |
|---|---|---|
| 3,328,339 | 6/1967 | Tierney. |
| 3,239,486 | 3/1966 | Willis. |
| 3,310,504 | 3/1967 | Vandenberg. |
| 3,313,741 | 3/1967 | Velzmann. |
| 3,026,270 | 3/1962 | Robinson. |
| 3,231,551 | 1/1966 | Herold. |

OTHER REFERENCES

Marsden: A.C.S. Organic Coatings & Plastics Chem., Atlantic City Meeting, Sepember 1965 (Aug. 17, 1965), p. 91–100.

Sterman: Modren Plastics, July 1963, pp. 125, 127, 129, 130, 134, 136, 138, 177.

Gruber: I&E,C Product Research & Development, September 1964, vol. 3, No. 3, pp. 94–199.

Lee and Neville: Handbook of Epoxy Resins, McGraw-Hill, New York, 1967, pages 2–16 to 2–19, 2–27, 2–31, 5–3 to 5–13, and 5–39.

ALLAN LIEBERMAN, Primary Examiner

H. H. FLETCHER, Assistant Examiner